United States Patent
Hintzer et al.

(10) Patent No.: US 6,512,089 B1
(45) Date of Patent: Jan. 28, 2003

(54) PROCESS FOR WORKING UP AQUEOUS DISPERSIONS OF FLUOROPOLYMERS

(75) Inventors: Klaus Hintzer, Woodbury, MN (US); Albert Killich, Burgkirchen (DE); Bernhard Hirsch, Burgkirchen (DE); Rudolf Erber, Garching (DE)

(73) Assignee: 3M Innovative Properties Company, St. Paul, MN (US)

( * ) Notice: Subject to any disclaimer, the term of this patent is extended or adjusted under 35 U.S.C. 154(b) by 180 days.

(21) Appl. No.: 09/936,639

(22) PCT Filed: Jan. 31, 2001

(86) PCT No.: PCT/US01/03152

§ 371 (c)(1),
(2), (4) Date: Sep. 12, 2001

(87) PCT Pub. No.: WO01/57096

PCT Pub. Date: Aug. 9, 2001

(30) Foreign Application Priority Data

Feb. 1, 2000 (DE) .......................................... 100 04 229

(51) Int. Cl.$^7$ .................................................. C08F 6/00
(52) U.S. Cl. ....................................................... 528/502
(58) Field of Search ......................................... 528/502

(56) References Cited

U.S. PATENT DOCUMENTS 4,623,678 A  11/1986  Moore et al. ................ 523/335

FOREIGN PATENT DOCUMENTS

GB   1172878   12/1969   ............. C08F/3/24

*Primary Examiner*—Terressa M. Boykin
(74) *Attorney, Agent, or Firm*—Dean M. Harts

(57) ABSTRACT

Process for working up aqueous dispersions of fluoropolymers. Fluoropolymer dispersions, in particular of fluoroelasomers, can be coagulated without adding chemicals, by compression with the aid of a gas and release through one or more small apertures.

19 Claims, No Drawings

PROCESS FOR WORKING UP AQUEOUS DISPERSIONS OF FLUOROPOLYMERS

DESCRIPTION

EP-B-0 591 888 discloses a process for working up aqueous dispersions of fluorinated thermoplastics, which comprises using hydrogen ions for substantive replacement of the cations in the aqueous dispersion resulting from the polymerization, compressing the dispersion, if necessary after diluting with water, releasing the compressed dispersion through one or more small aperture(s) so that it coagulates, applying the coagulated phase, if necessary after diluting with water and/or heating, to a filter where it is washed, mechanically dewatering the product, comminuting the same to give a free-flowing product and, if necessary, drying to the desired residual moisture. The work-up preferably takes place continuously.

The compression here may take place in commercially available high-pressure homogenizers. The compressive pressure depends on the apparatus available, and pressures are usually from 200 to 400 bar, appropriately about 300 bar.

In particular for semicrystalline fluorinated thermoplastics, this coagulation process gives excellent results with respect to degree of precipitation and purity of the precipitated product, and for process operating times. However, it is not transferable to fluoroelastomers, since some of the dispersion coagulates during the pumping required for compression, forming a coating on the apparatus, because the coagulate is tacky.

This makes continuous operation of the coagulation apparatus impossible.

Another disadvantage of the known process is that the apparatus required for the compression of dispersions is not everywhere available.

It has now been found that the process mentioned can be transferred to fluoroelastomers if the dispersion is compressed with the aid of a gas and the resultant compressed dispersion is released in a manner known per se through one or more small apertures, and so coagulates.

The invention therefore provides a process for the coagulation of fluoropolymer dispersions, in which the dispersion is compressed by gas pressure and the compressed dispersion is released through one or more small apertures, and so coagulates. Preferred embodiments of this invention are described in more detail below.

Fluoropolymers which may be used are any of the usual highly fluorinated polymers, in particular fluorinated thermoplastics prepared by the known emulsion polymerization process, and especially fluoroelastomers, or else mixtures of these with fluorinated thermoplastics. The crude dispersions may therefore be used directly with polymer contents of from 10 to 45% by weight.

Use may be made of any gas which does not react with the fluoropolymer or with the water, and these include carbon dioxide. Advantageous gases are those whose capability for dissolution in the dispersion under the conditions used is relatively good, since the result is a relatively porous coagulate, and therefore undesirable ancillary substances are relatively easy to remove during the washing which follows. The dissolution of the gas in the dispersion may take place at low pressure, followed by setting of the desired final pressure.

The amount of a gas which enters into the dispersion by way of dissolution under the desired pressure can be influenced by agitation, the mode of feed—for example by bubbling—and the duration of contact. If necessary, one skilled in the art may carry out routine experiments in this regard.

The dissolution of the gases and the application of pressure may take place at from 0 to 100° C., preferably at from about 20 to 40° C.

The compressive pressure depends on the gas used and may readily be determined by simple exploratory experiments. Pressures are usually from 50 to 400 bar ($5 \cdot 10^{-6}$ to $4 \cdot 10^{-7}$ Pa). The gas may be compressed using the usual compressors, that is to say the apparatus costs for producing the pressure required are substantially lower than for the process of EP-B-0 591 888.

Gases which may be used are inert gases, such as helium or argon, nitrogen, carbon dioxide, air and fluorinated hydrocarbons, where these do not liquefy under the conditions used. Preference is given to nitrogen, air and carbon dioxide.

The process of the invention can achieve high precipitation rates, and this is important not only with regard to the final yield of polymer but also for the recovery of the fluorinated emulsifier usually used from the wastewater formed in this process and composed of the aqueous filtrate, the treatment of which is made easier at the low resultant polymer concentrations in the filtrate (WO-A-99/62830 and WO-A-99/62858). The polymer content in the wastewater here should be well below 1% by weight.

A great advantage of the process of the invention is that the resultant coagulated polymer can be washed in a manner similar to that of the process of EP-B-0 591 888 on a filter belt, and can be dewatered on a belt press, advantageously at slightly subatmospheric pressure, whereas elastomers usually require complicated apparatus, such as screw systems (U.S. Pat. No. 4,132,845).

According to the invention, as in the process of EP-B-0 591 888, coagulation, washing and dewatering may preferably take place continuously.

The process is particularly advantageous for preparing high-purity polymers, e.g. when coagulating fluoropolymer latices prepared by emulsion polymerization with addition of little or no buffer and/or whose exchangeable ions have been removed, since the "mechanical" coagulation of the invention requires no addition of mineral acids or of salts, another factor advantageous for the recovery of the emulsifier (WO-A-99/62830).

The examples below describe the invention in more detail. Percentages are based on weight.

EXAMPLE 1

An aqueous dispersion having a content of 33% of a fluoroelastomer containing 60% of vinylidene fluoride units and 40% of hexafluoropropene units, as obtained from the polymerization, is brought to 250 bar using nitrogen, in a pressure vessel at room temperature, and released via the annular gap of a homogenizer (high-pressure homogenizer from APV Gaulin GmbH, Lübeck). The resultant coagulate is dewatered in a filter press, and washed. The aqueous filtrate (the undiluted aqueous phase separated from the coagulate) comprises 0.8% of polymeric material.

EXAMPLE 2

Example 1 is repeated, except that when the pressure is applied nitrogen is bubbled through the dispersion. The aqueous filtrate comprises 0.3% of polymeric materials.

EXAMPLE 3

Example 1 is repeated, except that an aqueous dispersion is used which has a content of 26% of a fluoroelastomer containing 31% of vinylidene fluoride units, 37% of hexafluoropropene units and 32% of tetrafluoroethylene units, and whose exchangeable ions have been removed. The aqueous filtrate comprises 0.5% of polymeric materials.

EXAMPLE 4

Example 3 is repeated, except that when the pressure is applied nitrogen is bubbled through the dispersion. The aqueous filtrate comprises 0.3% of polymeric materials.

EXAMPLE 5

An aqueous dispersion which has a content of 20% of a perfluoroelastomer containing 54% of tetrafluoroethylene units, 45% of perfluoro methyl vinyl ether units and 1% of bromotrifluoroethylene units and having a Mooney viscosity ML 1+10/121° C. of 85 (determined to ASTM D1646), and whose exchangeable ions have been removed, is brought to 180 bar using nitrogen in a pressure vessel at room temperature, and released via the annular gap of a homogenizer (high-pressure homogenizer from APV Gaulin GmbH, Lübeck). The resultant coagulate is dewatered in a filter press, and washed. The aqueous filtrate comprises 0.5% of solids.

EXAMPLE 6

Example 5 is repeated with the following modifications. carbon dioxide is used instead of nitrogen, the temperature is 40° C. and the pressure 100 bar. The aqueous filtrate comprises 0.3% of solids.

EXAMPLE 7

Example 5 is repeated with the dispersion whose exchangeable anions had not been removed. The solids content in the aqueous filtrate is 1%.

EXAMPLE 8

Example 1 is repeated, except that the following mixture was used:
- 80% of a terpolymer containing 31% of vinylidene fluoride units, 37% of hexafluoropropene units, 31% of tetrafluoroethylene units and 1% of bromotrifluoroethylene units, and having a Mooney viscosity ML 1+10/121° C. of 70 (determined to ASTM D1646), and
- 20% of a copolymer having 96% of tetrafluoroethylene units and 4% of perfluoro n-propyl vinyl ether units, MFI 372° C., 5 kg=2.2 g/10 min, determined to ISO 12086.

The aqueous filtrate comprises 0.5% of polymeric materials.

What is claimed is:

1. A process for coagulating a fluoropolymer dispersion comprising compressing an aqueous fluoropolymer dispersion with the aid of a gas and releasing the dispersion through one or more small apertures such that the dispersion coagulates.

2. The process of claim 1 wherein the fluoropolymer is a fluoroelastomer, or a mixture of a semicrystalline fluorinated thermoplastic with a fluoroelastomer.

3. The process of claim 1 wherein the gas pressure is from 50 to 400 bar.

4. The process of claim 2 wherein the gas pressure is from 50 to 400 bar.

5. The process of claim 1 wherein the gas is selected from nitrogen, carbon dioxide and air.

6. The process of claim 1 wherein a dispersion is used from which the exchangeable ions have been removed.

7. A process for purifying a fluoropolymer dispersion comprising compressing an aqueous fluoropolymer dispersion with the aid of a gas and releasing the dispersion through one or more small apertures to form a coagulated polymer;

washing the coagulated polymer; and dewatering the washed polymer.

8. The process of claim 7 wherein the steps are performed continuously.

9. The process of claim 7 wherein washing and dewatering take place on a filter belt.

10. The process of claim 7 wherein the fluoropolymer is a fluoroelastomer, or a mixture of a semicrystalline fluorinated thermoplastic with a fluoroelastomer.

11. The process of claim 7 wherein the gas pressure in the coagulating step is from 50 to 400 bar.

12. The process of claim 1 wherein the gas is selected from nitrogen, carbon dioxide and air.

13. The process of claim 1 wherein the exchangeable ions have been removed from the input fluoropolymer dispersion.

14. A process for coagulating a fluoropolymer dispersion comprising compressing an aqueous fluoropolymer dispersion with the aid of a gas and releasing the dispersion through one or more small apertures to form a coagulated polymer, wherein the fluoropolymer is selected from a fluoroelastomer, and a mixture of a semicrystalline fluorinated thermoplastic with a fluoroelastomer, and wherein the gas pressure is from 75 to 300 bar.

15. The process of claim 14 further comprising washing the coagulated polymer; and dewatering the washed polymer.

16. The process of claim 15 wherein washing and dewatering take place on a filter belt.

17. The process of claim 15 performed continuously.

18. The process of claim 15 wherein the gas is selected from nitrogen, carbon dioxide and air.

19. The process of claim 15 wherein the exchangeable ions have been removed from the input fluoropolymer dispersion.

* * * * *

UNITED STATES PATENT AND TRADEMARK OFFICE
CERTIFICATE OF CORRECTION

PATENT NO.     : 6,512,089 B1                                          Page 1 of 1
DATED          : January 28, 2003
INVENTOR(S)    : Klaus Hintzer et al.

It is certified that error appears in the above-identified patent and that said Letters Patent is hereby corrected as shown below:

Title page,
Item [56], References Cited, U.S. PATENT DOCUMENTS, please add:
-- 4,132,845     01/02/79     Covington, Jr. et al --

FOREIGN PATENT DOCUMENTS, please add:
-- EP 0 591 888 B     10/04/93     Europe
   WO A 99/62830     05/27/99     PCT
   WO A 99/62858     05/27/99     PCT --

Signed and Sealed this

Twelfth Day of August, 2003

JAMES E. ROGAN
*Director of the United States Patent and Trademark Office*